United States Patent [19]
Rudolphy

[11] 3,880,788
[45] Apr. 29, 1975

[54] MODIFIED NATURAL RESIN BINDER AND PROCESS FOR PREPARATION

[75] Inventor: Albert Rudolphy, Wiesbaden-Biebrich, Germany

[73] Assignee: Hoechst Aktiengesellschaft, Frankfurt am Main, Germany

[22] Filed: Oct. 3, 1972

[21] Appl. No.: 294,655

[30] Foreign Application Priority Data
Oct. 8, 1971 Germany............................ 2150216
Mar. 19, 1972 Germany............................ 2215235

[52] U.S. Cl. ................. 260/25; 106/218; 106/219; 260/27 R; 260/27 BB; 260/28.5 A
[51] Int. Cl. ...... C08g 5/22; C08g 37/16; C08d 9/12
[58] Field of Search.... 260/28.5 A, 27 R, 25, 27 BB

[56] References Cited
UNITED STATES PATENTS

| | | | |
|---|---|---|---|
| 2,311,200 | 2/1943 | Auer | 260/25 |
| 2,380,192 | 7/1945 | Schlaanstine | 260/25 |
| 2,439,824 | 4/1948 | Rostler et al. | 260/25 |
| 2,708,192 | 5/1955 | Joesting | 260/25 |
| 2,802,797 | 8/1957 | Lerch | 260/25 |
| 2,938,876 | 5/1960 | Morris | 260/25 |
| 2,995,537 | 8/1961 | Thompson | 260/27 BB |
| 3,360,488 | 12/1967 | Hall | 260/23 |
| 3,654,203 | 4/1972 | Daimer | 260/27 BB |
| 3,674,732 | 7/1972 | Pitzalis | 260/25 |

*Primary Examiner*—H. S. Cockeram
*Attorney, Agent, or Firm*—Littlepage, Quaintance, Murphy & Dobyns

[57] ABSTRACT

A process for the manufacture of a modified natural resin product wherein (a) a natural resin product such as colophony, wood rosin, tall oil, rosin acids or abietic acid is reacted with (b) at least one ethylenically unsaturated monomer having from 2 to 12 carbon atoms and being free from carboxylic groups and anhydride groups, and (c) a component selected from the group consisting of a phenol resin per se and its components, a product obtained by said process and a binding agent containing said product. The products are useful in adhesives and printing inks.

14 Claims, No Drawings

MODIFIED NATURAL RESIN BINDER AND PROCESS FOR PREPARATION

The invention relates to a process for the preparation of modified natural resin products.

The preparation of natural resin-modified phenol formaldehyde condensation products is known as is the possibility of modifying natural resin acids by reaction with unsaturated mono- or dicarboxylic acids or their anhydrides or acrylonitrile or acrylates. These products can at least partially be esterified or reacted with suitable metal compounds to form resinates by salt formation.

It is known to react additively natural resin acids under the influence of Friedel-Crafts catalysts or mineral acids in the presence of inert solvents with unsaturated compounds such as styrene or butadiene or the like. By the reaction of these addition products with suitable metal compounds resinsates are obtained which can be used for the preparation of drying oil-containing paints.

These known reaction products have the disadvantage that they are unsuitable for many applications, e.g. for printing ink binders, because they are relatively little cross-linked and therefore too soft so that they are absorbed by the paper substrate and their drying time is relatively long.

These disadvantages may be reduced or even avoided by the use of modified natural resin products prepared by the process according to the invention.

According to the present invention there is provided a process for the manufacture of a modified natural resin product wherein (a) a natural resin is reacted with (b) at least one ethylenically unsaturated monomer free from carboxylic groups and anhydride groups, and (c) a phenol resin per se or its compnents.

The resulting reaction product may if desired be at least partially esterified with polyhydric alcohols and may also if desired be reacted with minor quantities of carboxylic acids. If desired, the esterified or unesterified reaction products may be reacted with metal compounds to form metal salts. The products obtained according to the invention have the advantage that they have a certain desired hardness and that despite this they have adequate solubility, particularly in aromatic solvents.

Preferred unsaturated monomers are those having 2 to 12, advantageously 4 to 10 C-atoms, such as styrene, α-methylstyrene, vinyltoluene, indene, cyclopentadience, dicyclopentadiene and other olefins or olefin-containing hydrocarbon fractions such as, for example, those obtained in petroleum distillation, in each case individually or in admixture.

The natural resin can for example be in the form of natural resin acids such as colophony, wood rosin, tall rosin acids, abietic acid or the like.

Suitable phenol resins include, for example, resols such as those prepared from phenol; alkylphenol such as isopropyl, p-tert, -butyl-, cotyl or nonylphenol; cresols, e.g., m-cresol; 1,3,5-xylenols; also those prepared from diphenylolpropane and cumylphenol. Resins of trifunctitonal phenols, i.e., those phenols wherein three o- and/or p-positions to the phenol OH-group are free and reactive are preferred. The reaction of the natural resins with the phenol resin and the unsaturated monomers can take place in one or more stages but also in one stage in such a way that the phenol resin is either used as it is or is formed during the reaction from its ingredients. In the same way there are suitable the ingredients of these resins such as the above indicated phenols, as well as aldehydes with 1 to 7 C-atoms, particularly formaldehyde in various monomer and polymer forms, and also other aldehydes such as acetaldehyde, butyraldehyde, benzaldehyde, furfural or the like. By the use of phenol resin ingredients in the starting mixture the viscosity of the end products can be controlled in a convenient manner.

As polyhydric alcohols for the at least partial esterification can be used at least dihydric alcohols with 2 to 26 C-atoms such as ethane-, propane-, butane-, or hexane- diols, glycerin, trimethylol- ethane or -propane, pentaerythritol, sorbitol, dialcohols or novolac or diphenylolpropane such as are, e.g., obtained by reaction with ethylene oxide as well as propoxylated phenol-butyraldehyde-novolacs. Esterification causes not only a reduction of the acid number but also an increase in the number of molecules and therefore a rise in the viscosity and melting point of the products. A lower acid number has a favourable action on compatibility with pigments and a higher melting point on thermal stability.

Suitable reaction ingredients for salt formation to resinates advantageously include compounds of metals of the first and/or second group of the periodic system, such as magnesium, calcium and zinc compounds, particularly their salts or oxides such as magnesium oxide, magnesium acetate, calcium oxide, calcium acetate, zinc oxide, zinc acetate, zinc carbonate, aluminium acetate and sodium acetate. The metal salt groups react essentially neutral. In the same way as the esterification products the slightly acid or substantially neutral metal salts have good compatibility wiht pigments. In addition, the metal salts, provided that their content is low, lead to the reaction mixture not becoming basic, permit a rapid reaction during esterification, and the formation of products with a higher melting point. As a result of the metal salts there is a speedier solvent escape printing ink binders.

The reaction with the unsaturated monomers normally takes place with addiion to the unsaturated double bonds of the natural resin acid, e.g., colophony. These addition products have as low a crystallisation tendency as pure colophony so that they can be worked reliably. Generally up to 1 mol. of the unsaturated monomer is added to the colophony double bond. It is not essential to use a catalyst, it merely being necessary to raise the temperature to about 200° to 280°C, preferably 250° to 270°C. When using a catalyst, e.g., peroxide such as di-tert.-butylperoxide, dilauroyl peroxide, dicumyl peroxide, 2,5-dimethyl-2,5-bis-(tert.-butylperoxy)-hexane, 2,5-dimethyl-2,5-bis-(tert.-butylperoxy)-hexene, dibenzoyl peroxide, cumene hydroperoxide, and/or metal salts with an accelerating action such as cobalt salts, in particular cobalt carbonate, it is possible to work at lower temperatures e.g., 120° to 200°C, preferably 150° to 185°C.

The reaction between the natural resin, the unsaturated monomer and the phenol resin can be performed in random sequence. For example (a) the natural resin and/or (b) the phenol resin can be first reacted with the monomer and then the other ingredients (a) or (c) can be reacted. A further possibility is e.g., to react only the phenol ingredients or only the natural resin ingredients with the monomer and then react with the other ingredients (a) or (c) and optionally with the remaining monomer. In the known reaction of phenols with unsaturated monomers it is also possible to use catalysts such as mineral acids, organic acids, preferably toluene sulphonic acid or phenol sulphonic acid or Friedel-Crafts catalysts. The thus obtained products are then condensed with formaldehyde in the presence of alkali or ammonia, whereby further unsaturated monomers as solvents are superfluous. The condensation with formaldehyde can also take place simultaneously with the reaction with the natural resin.

If, in addition, reaction with a carboxylic acid is involved, it is for example possible to react (a) the natural resin optionally together with (c) the phenol resin or its ingredients, firstly with the unsaturated carboxylic acid ingredients or the monomer, optionally then reacting the other ingredients (c). It is also possible to initially react the phenol ingredients with the monomer and then ingredients (a). In all cases it is possible to optionally react further reagents such as polyhydric alcohols and/or metal compounds. A further possibility is that, e.g., firstly only the unsaturated carboxylic acids ingredients are reacted with the monomer, e.g., maleic acid with styrene in known manner with telomer formation. Preferably, however, the natural resin is firstly reacted with the unsaturated carboyxlic acid ingredient, advantageously dicarboxylic acid with adduct formation.

A further embodiment of the invention comprises that the natural resin or reaction product serving as the starting material is additionally modified with a modifying carboxylic acid with 3 to 9 C-atoms, e.g., a dienophilic mono- or polycarboxylic acid or its anhydride, advantageously maleic anhydride and/or further synthetic resins. The caboxylic acid increases the functionality of the products produced according to the invention. This functionality is, however, kept within limits by the incorporation of monomers. As a result of the incorporation of polar groups, also those of the incorporated phenols, the pigment wetting, particularly in the case of printing inks is improved. Generally minor quantities of acid, e.g., up to 5 percent by weight based on the natural resin, particularly colophony are used. In many cases it is, however, appropriate to use a larger acid proportion, thus an unsaturated acid ingredient can also be reacted in a proportion of over 5, advantageously 10 to 30 percent by weight based on the natural resin. Suitable acids are, for example, benzoic acid, succinic acid, adipic acid, phthalic acids, such as o-phthalic acid, iso-phthalic acid, trimellitic acid, maleic acid, fumaric acid, itaconic acid, acrylic acid, methacrylic acid, phenolcarboxylic acid as well as its derivatives, such as their anhydrides, in as far as these exists, esters, amides or the like. These acids can be at least partially esterified in the end product by the above-indicated alcohols. In this way natural resin esters are obtained, e.g., of polyhydric alcohols, which are still esterified with small amounts of acid. The esterification of the carboxylic acids can take place before or after the addition thereof, whereby the above-indicated alcohols can serve as esterification ingredients. For the modification generally dienophilic carboxylic acid, advantageously maleic anhydride is preferred.

The unsaturated carboxylic acid which is added to this natural resin in larger quantities increases, in the form of the tricarboxylic acid thereby formed, the functionality of the reaction ingredients, whereby a higher cross-linking of the resins produced therewith is obtained. However, this effect is compensated or kept in limits to such an extent by the incorporation of unsaturated monomers that the resins produced according to the invention retain the solubility in organic solvents necessary for their use. As a result of the increased proportion of carboxy groups or the anhydride ester or carboxy groups produced therefrom, particularly good pigment-wetting characteristics of the reaction products are obtained, together with an improved storage stability of the binders produced therefrom.

If saturated, i.e., free from polymerisable bonds mono- and/or polycarboxylic acids are used, their proportion is only small e.g., at most 5 percent by weight based on the natural resin.

Thus, with the process according to the invention it is possible to obtain natural resin esters, e.g., of polyhydric alcohols which are esterified with various acids. Acids present in the reaction mixture and unreacted with the natural resin can, e.g., form unsaturated polyesters with the alcohols which can also cross-link with the unsaturated monomers. Of the unsaturated dicarboxylic acids, however, 5 to 30 percent by weight should be added to the natural resin whereby the percentage is based on the natural resin.

The process can be performed particularly advantageously if the unsaturated monomers in the first stage serve at least partially as solvents. This is particularly the case if a fraction of unsaturated hydrcarbons isused as the unsaturated monomer ingredient. These monomer compounds can thereby serve both as entraining agents as well as for the chemical incorporation in the reaction products.

In place of or together with the modifying carboxylic acids it is also possible to use other resins for the modification of the products obtained according to the invention, e.g., hydrocarbon resins, as obtained by the polymerisation of petroleum fractions or the like, including cumarone-indene resins and ketone resins such as cyclohexanone resins, methylethylketone aldehyde resins and benzophenone aldehyde resins. These resins are not per se particularly suitable for printing ink binders but can be used as diluents for the products according to the invention. The proportion of modifying resins can be up to 250 percent based on the natural resin; advantageously however it does not exceed 100 percent.

The proportion of natural resins in the reaction products can be in the range of 15 to 85, advantageously 20 to 70 percent by weight based on the total reaction product. Surprisingly, products with a relatively lower natural resin content of, e.g., only 15 percent by weight colophony have equally good printing characteristics as the hitherto known products with a higher colophony content. The colophony proportion can therefore be kept relatively low which leads to particularly inexpensive products.

The proportion of monomers is generally 0.2 to 20, advantageously 10 to 16 percent by weight based on the total reaction product. The molar ratio of the unsaturated monomers to the phenols amounts to generally 0.01 − 1 : 1, advantageously at least 0.5 : 1 and the molar ratio of formaldehyde to phenol is generally up to 2 : 1, advantageously 0.9 to 1.5 : 1.

The proportion of condensed or uncondensed phenols is generally 1 to 50, advantageously 25 to 35 percent by weight based on the total reaction product. In resinates the proportion of phenol resin is generally 10 to 40, advantageously 15 to 35 percent by weight based on the colophony. It can, however, prove advantageous to reduce the phenol or phenol resin proportion to such an extent that as a result of the increased proportion of unsaturated dicarboxylic acid the functionality of the starting ingredients is increased.

If the reaction products are obtained in the form of their metal resinates it is advantageous if the metal content is 1 to 7, advantageously 2 to 4.5 percent by weight based on the total reaction product. Often mixtures of metals are advantageous, e.g., the ratio of metal proportion in the form of magnesium salts and the metal proportion in the form of calcium or mixtures of calcium and zinc salts can vary betweenn 2 : 1 and 1 : 2. This is particularly advantageous for printing inks because among other things the storage stability is improved. Thus printing inks which contain magnesium resinates with yellow pigment dyes provide stable mixtures which during storage have a lower viscosity rise and a lower greening tendency than with the hitherto known toluene gravura resins which dry equally quickly and have the same content of yellow pigments.

Depending on the intended use according to the invention products can be obtained which have a higher or lower viscosity. This can, for example, be controlled by the selection of the quantity of monomer used. With a higher proportion of unsaturated monomers, for example resins of lower viscosity are obtained. The unsaturated monomers contained in the reaction products, particularly as mono-functional components, can also act as chain- stoppers against too great cross-linking. A further advantage of the products according to the invention is that they are more stable to oxygen than the known addition products which can be attributed to the reduced content of colophony and double bonds. As a result the films produced from these products are more resistant to embrittlement.

The resins obtained according to the invention have an overall reduced susceptibility to undesirable cross-linking phenomena and therefore have a good storage stability. In addition they have a good adhesion to substrates. As they have good solubility in conventional solvents, particularly aromatics, such as toluene, xylene in aromatic-containing solvent mixtures and the resins produced according to the invention very rapidly give off the solvents, they are very suitable for use as binders for printing inks, particularly for toluenerotogravure printing. A higher proportion of phenol resin ingredients leads to a more rapid giving off of the solvents when using the products as printing ink binders.

Binders produced from the resins obtained according to the invention are further characterised by a very good adhesion to very varied substrates so that they are suitable for example particularly for printing foils of varied types, e.g., those of polylofeins such as polyethylene and polypropylene, particulary by means of flexoprinting. These printing inks resist the tear off test with adhesive tapes. In addition the resins are suitable as binders for other purposes particulary in combination with further polymers such as natural and synthetic rubber types, fatty oils, alkyd resins and other film constituents, so that they can be used in paints, adhesives and sealants. Here again the rapid giving off of solvents, good pigment-wetting, storage stability and compatibility prove advantageous. Those products produced according to the invention wherein the free carboxy groups are converted to salt or ester groups are particularly readily compatible with other binders, e.g., with chlorinated rubber and pigments. In adhesives containing polychloroprene rubber the resins produced according to the invention can increase the so-called "assembly time" but still have very good stability values.

In the following Examples, which are given by way of illustration only, percentages are by weight.

EXAMPLE 1

1,500 g of balsam colophony are melted and 350 g of styrene added thereto. Within 90 minutes the mixture is heated to 270°C and kept for 7 hours at 270° to 275°C. The volatile components are then removed for ten minutes at a pressure of 25 mm Hg by distillation. In this way 1,743 g of solid resin are obtained with a melting point of 58°C (capillary method), and acid number of 124 and a viscosity of 9.1 cP (50 percent in toluene according to Ubbelohde).

900 g of the addition product obtained are melted and then esterified with 615 g of propoxylated phenol-iso-butyraldehydenovolac with an OH-number of 280 in the form of 67 percent butanol solution in the presence of 0.5 g of zinc oxide. The novolac solution is thus added on reaching a temperature of 200°C within 30 minutes accompanied by distillation of butanol. The mixture is then heated to 270°C and as an entraining agent about 30 g of xylene are used. After a total of 10 hours reaction of the novolac, the entraining agent is removed at a pressure of 25 mm Hg. 1,248 g of a resin with a melting point of 56°C (capillary method), an acid number of 40, a viscosity of 12 cP (accoding to Ubbelohde), a solubility in white spirit of 1 : 4 which is freely soluble in ethyl acetate and toluene are obtained, The addition of styrene to colophony can, instead of as described above, take place at 150° to 185°C in the presence of peroxide, e.g., 3.5 to 40 g of t-butyl-peroxide and 0.35 g of cobalt carbonate.

EXAMPLE 2a 2,250 g of colophony are reacted with 525 g of styrene according to Example 1 with the difference that the mixture is heated for 2 hours at 270°C. 500 g of the product obtained are heated to 160°C, and then 40 g of an alkyl-phenol-formaldehyde resin (from 1 mol of p-tert.-butylphenol and 1.6 mol of formaldehyde, melting point 70°C capillary method) are added. Subsequently at 150°C a water-soluble resol (viscosity according to Ubbelohde 250 cP) is added. The resol quantity is given in the following Table:

| Mixture | 2a/1 | 2a/2 |
|---|---|---|
| Phenol-formaldehyde-resin | 40 g | 59.5 g |
| Magnesium oxide | 15 g | 7.5 g |
| Calcium oxide | — | 7.5 g |
| Yield | 538 g | 551 g |
| Melting point (capillary method) | 139°C | 125°C |
| Acid Number | 52 | 35 |
| Viscosity (50% in toluene) | 300 cP | 245 cP |

The mixture is heated for 1 hour at 200°C, whereby 30 g of xylene and the metal oxides indicated in the Table are used. With return of the xylene heating takes place for 4 hours at 250° to 260°C and finally under reduced pressure of 50 mm Hg for 5 minutes at 280°C.

The products obtained can be seen from the above Table.

In place of magnesium oxide it is also possible to use zinc or calcium oxide, whereby the metal content of the product can, e.g., be 6.8 percent.

Printing Testing

The binders are dissolved in toluene as a 50 percent solution and processed with 20 percent by weight based on the solid content of "Pigmentrot 57" (Calcium salt lacquer of β-hydroxyoxynaphoic acid) by means of a rapidly rotating glass ball mill to a particle size of less than 5μ. The printing inks obtained are adjusted to a 17 sec. outflow time by adding toluene to a 4 mm DIN-beaker and in each case drawn up by a 36 μ wire coil onto machine-coated paper or a non-absorbing terephthalate foil. The drying rates in seconds are determined by pressing down the side of the hand.

The printing ink applications to paper are left overnight and the gloss is determined by means of a Lange glossmeter. For comparison, a commercial gravure resin in the form of a colophony calcium zinc salt (melting point/capillary method 155°C, acid number 70, viscosity 50 percent in toluene 270 cP) cross-linked with a water-soluble resol is tested. The results are given in the following Table.

EXAMPLE

|  | 2a/1 | 2a/2 | Comparative sample |
|---|---|---|---|
| Solvent given off in sec.) |  |  |  |
| Machine-coated paper*) | 42 | 46 | 38 |
| Terephthalate foil | 50 | 48 | 48 |
| Lange glossmeter ) |  |  |  |
| Machine-coated paper*) | 65 | 75 | 60 |
| Outflow times in sec. |  |  |  |
| after 4 weeks storage | 17.5 | 19 | 28 |

In the table the tests with the resins obtained according to the invention show a substantially identically rapid giving off of solvents as the comparative tests with the higher melting commercial product, but also a higher gloss and after storage a considerably reduced increase in viscosity.

EXAMPLE 2b

The same binders as in Example 2a are processed instead of with 20 percent pigment red with 12.5 percent of previously dispersed "Pigmentgelb" (yellow benzidine dye) in the same way as in Example 2a and tested with the following results:

EXAMPLE

|  | 2b/1 | 2b/2 | Comparative sample |
|---|---|---|---|
| Outflow times after 4 weeks storage in sec. | 25 | 33 | 70 |
| Outflow times after 7 days storage and intermittent shaking at 50°C | 55 | 110 | 450 |

These tests show that the printing ink binders with magnesium resinates produced according to the invention have a particularly favourable storage behaviour which applies both for the pure magnesium salts and for the mixed salts. The pure or mixed salts produced with other metal compounds such as zinc or calcium are also less susceptible to viscosity rises than the binders of the comparative test.

EXAMPLE 3a 450 g of phenol are heated in the presence of 27.75 cc of 0.5 N—HCl with 400 g of styrene to a temperature of 100°C and the mixture is brought within 8 minutes to 115°C. The mixture is refluxed for 3 hours at 115°–117°C, then cooled. 12.65 cc of 33% NaOH and 236 g of paraformaldehyde are added, followed by reacting for 2 hours at 80°C and cooling to room temperature. 1,126 g of a product with the following characteristics are obtained: viscosity (50 percent toluene solution according to Ubbelohde 20°C) 3,480 cP, formaldehyde 3.6 percent, residue (2 g of resin per hours 135°C) 78.5 percent.

In place of styrene it is also possible to react the corresponding amount of methyl styrene or vinyl toluene and in place of phenol the corresponding quantity of butyl- or octyl-phenol or diphenylolpropane.

1,500 g of Portuguese colophony are melted and at 150°C mixed with 100 g of glycerin and 20 g of zinc oxide. At 130°C 950 g of modified phenol resin are added and the mixture is heated to 260°C within 3½ hours, and is then kept at this temperature for 3 hours and finally the volatile ingredients are removed for 15 minutes at 50 mm Hg. 2,248 g of resin with the following characteristics are obtained: melting point (capillary) 124°C, acid number 34, viscosity (50 percent in toluene according to Ubbelohde at 20°C) 328 cP.

EXAMPLE 4a 725 g of phenol are melted, and then 350 g of indene at 50°C, followed by 0.5 cc of a 65 percent solution of p-phenolsulphonic acid are added. After 3 hours reaction under reflux at 178° – 194°C, cooling to 40°C takes place. Then 7.5 cc of 33% NaOH and 244 g of paraformaldehyde are added and condensed for 2 hours at 80°C. 1,325 g of resin with the following characteristics are obtained: viscosity 2,690 cP, formaldehyde content 0.6 percent, residue 75.5 percent.

1,232 g of this resin are reacted with colophony according to Example 3a. 2,457 g of a resin with the following characteristics are obtained: melting point (capillary) 119°C, acid number 47, viscosity (50 percent in toluene) 484 cP.

EXAMPLE 5a

Working as in Example 4a, but instead of indene, a mixture of 70 g of indene, 70g of styrene, 70 g of vinyl toluene and 70 g of dicyclopentadiene is used. Refluxing takes place for 3 hours at 182° – 194°C, followed by condensing with the same quantities of NaOH and paraformaldehyde. 1,255 g of resin with the following characteristics are obtained: viscosity (according to Ubbelohde) 2,510 cP, formaldehyde content 0.6 percent, residue 73.2 percent.

The resin is processed further as in Example 4a and 2,385 g of a product with the following characteristics are obtained: melting point 119°C, acid number 47, viscosity (50 percent in toluene) 431 cP.

EXAMPLES 3b to 5b

Printing Tests

The binders produced according to Examples 3a to 5a were tested from a printing standpoint according to Example 2a. The results are given in the following Table. For comparison purposes a resin based on one colophony reacted with diphenylolpropane-formaldehyde resin (Resol), maleic acid and pentaerythritol with a melting point of 135°C, an acid number of 18 and a viscosity of 300 cP was used.

| Example | 3. | 4a | 5a | Comparison product |
|---|---|---|---|---|
| Pigment residue as a percentage (2 g of pigment/½ hour at 150°C) | 41.1 | 41.7 | 41.3 | 40.1 |
| Solvent given off in sec: | | | | |
| Machine coated paper | 55 | 47 | 45 | 62 |
| Terephthalate foil | 58 | 47 | 48 | 78 |
| Lange gloss value: | | | | |
| Machine-coated paper | 85 | 85 | 78 | 68 |

The Table shows that the printing inks produced with the resins according to the invention have excellent drying times and a better gloss than the comparative products. The excellent adhesion of the printing inks to polyethylene and polypropylene foils is particularly noteworthy. Thus, for example, it is not possible by means of adhesive tape to remove the ink layers from the foil substrates.

EXAMPLE 6

To 1,420 g of phenol were added at 60°C initially 6 cc boron trifluoride-diethyl-etherate and then with 10 minutes 1,500 g of indene. The temperature was raised to 160°C. The reaction mixture was then brought to 205° to 230°C, refluxed at this temperature for 3 hours and then cooled. 2,925 g of a reaction product with a viscosity of 3,560 cP, which is compatible in any ratio with alcohol, acetone, ethyl acetate and ethylene glycol monoethyl ether, but is not compatible with benzene in the boiling range 160° – 200°C.

1,500 g of colophony were melted at 170°C with 110 g of glycerin, 585 g of the reaction product obtained in the first stage, 400 g of a water-soluble phenol-formaldehyde resol (molar ratio phenol : formaldehyde 1 : 1.5; residue of 68.5 percent after 1 hour at 135°C, viscosity 285 cP), 100 g of paraformaldehyde and 20 g of zinc oxide are added. The mixture was kept for 1 hour at 100°C, and then heated for 2½ hours to 260°C. kept for 3½ hours at this temperature, and then the volatile ingredients were distilled off under reduced pressure. 2,368 g of a reaction product with a melting point of 127°C, an acid number of 44 and a viscosity of 455 cP (50 percent in toluene) were obtained.

EXAMPLE 7

1,420 g of phenol were mixed at 60°C with 6 cc of boron fluoride-diethyl-etherate. Within 15 minutes 1,600 g of a hydrocarbon fraction mixture (1 : 1) of the following composition were added: Fraction A = 3.4 percent by weight styrene, 11.8 percent by weight of $\alpha$-methyl-styrene, 29.7 percent by weight of vinyltolulene, 5.3 percent by weight of $\beta$-methyl-styrene, 7.3 percent by weight of indene and 42.4 percent by weight of non-olefinic ingredients. Fraction B = 0.4 percent by weight of $\alpha$-methyl-styrene, 9.1 percent by weight of vinyltoluene, 8.2 percent by weight of $\beta$-methyl-styrene, 62.3 percent by weight of indene and 20 percent by weight of non-olefinic ingredients. The temperature rises to 122°C and drops after a few minutes to 118°C. The mixture is then refluxed for 1 hour at 180° to 193°C and then cooled. 2,226 g of a product with a viscosity of 172 cP, which is freely compatible with alcohol, acetone, ethylene glycol monoethylether and benzene of boiling range 160°-200°C is obtained.

620 g of the reaction product and 80 g of paraformaldehyde are reacted as in Example 6 with colophony. 2,186 g of resin with the following characteristics are obtained: melting point 125°C, acid number 42, viscosity (50 percent in toluene) 515 cP.

The resins obtained according to Example 6 and 7 as printing ink binders also rapidly give off solvents and have a higher gloss than comparative products with known resins.

EXAMPLE 8

According to Example 1 1,820 g of balsam colophony are melted at 140°C, 125 g of glycerin, 25 g of zinc oxide and 725 g of the phenol-formaldehyde-condensate used in Example 2a are added. Prior to the addition of the resin 500 g of styrene are added. The mixture is heated for 5 hours with the removal of the water formed until 260°C is reached and is kept at this temperature for a further 1½ hours. 2,741 g of resin with the following characteristics are obtained: melting point 132°C, acid number 47, viscosity (50 percent in toluene) 347 cP, freely solubile in toluene, colophony content 66.4 percent. 66.4 percent.

When working in the same way but without styrene the product gels at a temperature of 220°C, so that it cannot be processed further.

EXAMPLE 9

450 g of tall oil resin are condensed under reflux for 2 hours with 470 g of phenol, 75 g of a 30 percent formaldehyde solution, 150 g of para-formaldehyde and 10 g of zinc oxide. Then 60 g of maleic anhydride are added and after a further hour 100 g of styrene and the remaining 700 g of tall oil resin are added. On removal of the water formed, the mixture is heated to 170°C and 158 g of glycerin are added. Heating then takes place at 250°C, and at this temperature within 1½ hours a further 100 g of styrene are added. The temperature drops to 235°C and then rises within 1 hour to 260°C and is kept at this temperature for 4 hours. The volatile constituents are then distilled off under reduced pressure. After a total of 11 hours 1,916 g of resin are obtained with the following characteristics: melting point 123°C, acid number 37, viscosity (50 percent toluene solution) 610 cP.

The maleic anhydride can also partially be replaced by a dicarboxylic acid without olefinic double bonds, such as isophthalic acid.

EXAMPLE 10

1,500 g of colophony are melted and accompanied by stirring are added at 160°C 100 g of glycerin, 20 g of zinc oxide, 350 g of indene and 650 g of a water-soluble phenol-formaldehyde resin (resol, viscosity 280 cP, residue 68.5 percent, molar ratio formaldehyde : phenol 1.5 : 1). The mixture is heated for 3 hours at 260°C. After a further 3 hours at this temperature the volatile ingredients are removed. 2,136 g of resin with the following characteristics are obtained: melting point 134°C, acid number 44, viscosity (50 percent in toluene) 178 cP.

The product obtained is suitable both as a binder for gravure printing inks and as an ingredient in adhesives, particularly together with polychloroprene rubber.

EXAMPLE 11

1,500 g of colophony are melted at 160°C, 14 g of calcium oxide are added and after 30 minutes 100 g of glycerin, 350 g of styrene and 600 g of the phenol-formaldehyde resin according to Example 10. With the removal of water, heating takes place for 2 hours at 260°C. Subsequently the volatile ingredients are removed under reduced pressure. 2,189 g of resin with the following characteristics are obtained: melting point 122°C, acid number 44, viscosity (50 percent in toluene) 434 cP. The product obtained is suitable as a printing ink binder and for adhesives.

EXAMPLE 12

A mixture of 1,500 g of molten colophony, 100 g of glycerin, 20 g of zinc oxide, 350 g of styrene, 675 g of phenol-formaldehyde resin (molar ratio formaldehyde : phenol = 1.5 : 1 resol), 64 g of p-cumyl-phenol and 15 g of formaldehyde are heated for 4 hours at 260°C and reacted at this temperature for a further 3 hours. 2,316 g of a resin with the following characteristics are obtained: melting point 122°C, acid number 41, viscosity (50 percent in toluene) 353 cP. The product obtained is suitable as a binder for printing inks and adhesives.

EXAMPLE 13

500 g of colophony are melted with 1,000 g of dimerised colophony, 91 g of glycerin, 20 g of zinc oxide, 350 g of styrene 450 g of phenol-formaldehyde-condensation product are added and the mixture is heated for 3 hours at 260°C. After a further 3 hours at 260°C the volatile ingredients are distilled off under reduced pressure. 2,097 g of resin are obtained with the following characteristics: melting point 125°C, acid number 47, viscosity (50 percent in toluene) 155 cP. The product obtained is suitable as a binder for printing inks and adhesives.

EXAMPLE 14

Working as in Example 13, but instead of dimerised colophony here 1,000 g of a partially intramolecularly esterified reaction product of colophony and phenol (molar ratio about 1 : 1) are used. 2,143 g of resin with the following characteristics are obtained: melting point 124°C, acid number 41, viscosity (50 percent in toluene) 107 cP.

EXAMPLE 15

1,500 g of colophony are melted and 300 g of a telomer of 8 mol of styrene and 1 mol of maleic anhydride (melting point 100°C, acid number 62, viscosity 64 cP) are added at 170°C. At 150°C 111 g of glycerin, 20 g of zinc oxide, 350 g of styrene and 625 g of phenol-formaldehyde resin according to Example 10 are added. The mixture is heated for 3 hours at 260°C and after a further 2 hours the volatile ingredients are removed. 2,518 g of resin with the following characteristics are obtained: melting point 125°C, acid number 39, viscosity (50 percent in toluene) 371 cP.

EXAMPLE 16

1,500 g of colophony are melted and at 160°C 20 g of maleic anhydride, and then 15 g of sorbitol, 75 g of glycerin and 250 g of a propoxylated butyraldehyde-phenol-novolac (hydroxyl number 270) are added as further esterification components. Then 350 g of styrene, 20 g of zinc oxide, 500 g of phenol-formaldehyde resin according to Example 10, 150 g of phenol and 55 g of paraformaldehyde are added. Condensing takes place for 1 hour at 100°C and then with continuous water-removal heating takes place for 2 hours at 260°C. Then over the period of one hour the volatile ingredients are removed at 250°C under reduced pressure. 2,510 g of a resin with the following characteristics are obtained: melting point 122°C, acid number 40, viscosity (50 percent in toluene) 370 cP.

The products of Examples 14 and 16 are suitable both as binders for printing inks and adhesives.

EXAMPLE 17

1,200 g of colophony are reacted with 600 g of a hydrocarbon resin (melting point 142°C, acid number 28, viscosity 120 cP) modified with maleic anhydride, 20 g of maleic anhydride, 15 g of pentaerythritol, 350 g of styrene, 400 g of phenol-formaldehyde resin (resol according to Example 10), 380 g of phenol and 150 g of paraformaldehyde, in the presence of 20 g of zinc oxide. With water removal the mixture is brought to 260°C and by adding xylene under continuous return flow is kept for 3 hours at 260°C. The volatile ingredients are removed for a further 15 minutes at 50 mm Hg. 2,730 g of resin with the following characteristics are obtained: melting point 124°C, acid number 38, viscosity (50 percent in toluene) 290 cP, colophony content 44 percent by weight. The resin is suitable both as a printing ink binder and for adhesives.

EXAMPLE 18

Processing takes place as in Example 17, but with 600 g of cumarone indene resin (melting point 80°C, acid number 0.1, viscosity (50 percent in toluene) 13 cP) in place of hydrocarbon resin and with vinyl toluene in place of the same amount of styrene. 2,740 g of resin with the following characteristics are obtained: melting point 116°C, acid number 38.7, viscosity (50 percent in toluene) 190 cP, colophony content 43.8 percent by weight. The resin is suitable for printing ink binders and for adhesives. In place of the cumarone resin it is also possible to use ketone resin, e.g., based on methyl-cyclohexanone-hexanone-formaldehyde resin (melting point 120°C).

EXAMPLE 19

Processing takes place as in Example 17, but will 900 g of colophony and 900 g of a hydrocarbon resin (melting point 95°C, acid number 0, viscosity (50 percent toluene solution) 20 cP). In place of the styrene a mixture of 200 g of styrene, 50 g of vinyl toluene and 100 g of indene are used. The proportion of phenol resin is 450 g and the proportion of paraformaldehyde 190 g. 2,719 g of resin with the following characteristics: melting point 112°C, acid number, 38, viscosity (50 percent in toluene) 195 cP, colophony content 32.7 percent by weight, are obtained. It is suitable for use as printing ink binder and for adhesives.

If in place of the 900 g of hydrocarbon resin, 1,050 g thereof is used, and in place of the 900 g of colophony only 450 g thereof, and in place of the monomer mixture 350 g of styrene are introduced, 2,467 g of resin with the following characteristics are obtained: melting point 104°C, acid number 25, viscosity (50 percent in toluene) 147 cP, colophony content 18.3 percent by weight.

The initially described product is processed to form an adhesive having the following composition:

45 g of the resin produced according to the invention
100 g of polychloroprene rubber
5 g of magnesium oxide
4 g of zinc oxide
370 g of solvent (ethyl acetate : toluene : benzene=1:1:1)

Testing the adhesive mass led to an assembly time of below 8 hours, a separating strength rubber/rubber of 6.3 (at 20°C) or 0.9 (at 50 C) kg/cm and a thermal stability of 12 minutes at 50°C.

EXAMPLE 20

1,000 g of colophony are melted with 650 g of p-phenylphenol and 115 g of octylphenol and after adding a mixture of 100 g of styrene, 50 g of vinyl toluene, 50 g of indene and 100 g of dicyclopentadiene condensed with 300 g of paraformaldehyde and 20 g of zinc oxide for 2 hours at 100° – 120°C and then with continual water removal heated to 260°C. This temperature was maintained for 3 hours and as reactive monomers which simultaneously serve as entrainers are added 100 g of a hydrocarbon fraction from petroleum distillation which contains 38 percent by weight of styrene, 27 percent by weight of xylene, 15 percent by weight of ethylbenzene, 18 percent by weight of cumene and 12 percent by weight of 1-methyl-4-ethylbenzene. 2,095 g of resin are obtained with the following characteristics: melting point 111°C, acid number 67, viscosity (50 percent in toluene) 34.2 cP. The resin is suitable for printing ink binders and adhesives.

Testing of the adhesive mass took place as in Example 19 and led to an assembly time of 60 minutes, a separating strength rubber/rubber of 5.0 at 20°C and 1.7 at 50°C kg/cm and a thermal stability of 30 minutes at 50°C. The resins produced according to the invention have a longer assembly time and a considerably higher thermal stability than the comparative test with a known resin.

EXAMPLE 21

1,500 g of Portuguese colophony are melted and 900 g of styrene and 900 g of phenol-formaldehyde resin (resol according to Example 10) are introduced. With continuous removal of water, the mixture is heated for 3 hours at 270°C and by adding 30 to 60 cc of xylene with continuous reflux kept at 270°C for 3 hours. The volatile ingredients are then removed under reduced pressure. 2,896 g of resin with the following characteristics are obtained: melting point 108°C, acid number 62.3, viscosity (50 percnet in toluene) 121 cP, colophony content 51.7 percent by weight. The resin is suitable as a binder for printing inks and adhesives.

EXAMPLE 22

333 g of colophony are heated to 160°C with 300 g of a propoxylated phenyl-isobutyraldehyde-novolac (melting point by the capillary method 50°C, OH-number 260) produced from 1 mol of phenol, 0.7 mol of isobutyraldehyde and 1 mol of propylene oxide and mixed with 70 g of maleic anhydride. After 30 minutes at 180°C 9 g of zinc oxide, 250 g of styrene and 113 g of a water-soluble phenol-formaldehyde resin (resol, molar ratio formaldehyde: phenol 1.6 : 1, hardening residue 68.5 percent after 1 hour at 135°C) and 32 g of glycerin are added. The mixture is heated to 270°C with water removal and with the addition of a total of 30 ml of xylene with continuous return of the solvent kept at 270°C for 3 hours. The volatile ingredients consisting of the entraining agent, unreacted phenol and monomer proportions are removed by evacuation for 15 minutes at 50 mm Hg and 270°C. 1,000 g of resin (colophony content 35 percent) with the following characteristics are obtained: melting point by the capillary method 117°C, acid number 25, viscosity 1,200 cP (50 percent in toluene according to Ubbelohde at 20°C), freely soluble in toluene. The resin is, e.g., suitable as a printing ink binder and as an additive resin to polychloroprene adhesives.

EXAMPLE 23

Processing takes place as in Example 22, but without glycerin. 995 g of a less viscous resin than in Example 1 are obtained with a colophony content of 33.5 percent, and the following characteristics: melting point 110°C, acid number 46, viscosity 241 cP, freely soluble in toluene. The resin can be used for the same purposes as that the Example 22.

EXAMPLE 24

1,500 g of American wood colophony are heated with 315 g of maleic anhydride for 30 minutes at 220°C, and then 15 g of zinc oxide are added. After a further 15 minutes at 220°C 320 g of glycerin and 250 g of a phenol-formaldehyde resin (visocity 9800 cP, formaldehyde content 0.75 percent, hardening residue 80.5 percent after 1 hours at 135°C), modified with 34.7 percent by weight of styrene and 500 g of styrene are added. The mixture is heated at 240°C with continuous return of the styrene. Within 70 minutes a further 100 g of styrene are added dropwise whereby the mixing temperature in 30 minutes is raised to 200°C. By gradual addition of 80 g of a petroleum fraction with a high olefin content (29 percent by weight of indene, 32 percent by weight of methyl-idene, 1.4 percent by weight of vinyl toluene, 8.2 percent by weight of β-methyl-styrene and the remainder non-olefinic ingredients) the temperature is adjusted to 260°C with return of the unreacted monomers. After heating for a total of 3½ hours at 260°c, the volatile ingredients are removed at 50 mm Hg within 15 minutes. 2,784 g of resin (colophony content 53 percent by weight) are obtained with the following characteristics: melting point 115°C, acid number 49, viscosity 90 cP. A mixture of 10 g of a 50 percent solution of this resin in toluene with 10 g of a 20 percent chlorinated rubber solution reveals no de-mixing characteritics after 14 days storage. This mixture is usable as a printing ink binder. It shows the good compatibility of the products according to the invention with chlorinated rubber.

EXAMPLE 25

1,500 g of colophony are heated to 200°C for 30 minutes with 200 g of maleic anhydride. Then are added 20 g of zinc oxide and 250 g of glycerin, and subsequently 820 g of a resol (produced from the addition product of 1,776 g of phenol, 1.3 ml of 65 percent p-phenolsulphonic acid and 1,840 g of styrene by subsequent alkaline condensation with 592 g of formaldehyde, viscosity 9,000 cP, formaldehyde content 0.45 percent, hardening residue 50 percent in 80 percent butanol after 1 hours at 135°C). Then 100 g of a phenol-styrene-adduct (from 1,776 g of phenol and 1,840 g of styrene) and 60 g of formaldehyde are added and the mixture is heated for 1 hour at 120°C, then for 2 hours at 260°C and maintained at this temperature for 3½ hours. Subsequently the volatile ingredients are removed after 15 minutes at 50 Torr and 260°C. 2,644 g of resin (colophony content 56.8 percent by weight) are obtained with the following characteristics: melting point 130°C, acid number 46.9, viscosity 467 cP, solubility in toluene random. The resin is equally compatible with chlorinated rubber as the product of Example 3 and is very suitable as a printing ink binder.

PRINTING TEST

The printing test was performed as in Example 2a, the same comparison product being used as in Examples 3b to 5b.

In addition to dye residue was determined. A metal sheet was coated with 2 g of dye and 2 g of toluene and the mass was treated for ½ hour at 150°C in the drying cubicle and then the residue was determined.

The results are given the following Table 1.

Table 1

|  | Examples | | | | Comparative product |
|---|---|---|---|---|---|
|  | 22 | 23 | 24 | 25 | |
| Dye residues as a % | 29.8 | 44.6 | 48.5 | 41 | 40.1 |
| Solvent given off in seconds: | | | | | |
| Machine-coated paper | 60 | 65 | 52 | 50 | 62 |
| Terephthalate foil | 65 | 68 | 56 | 54 | 78 |
| Lange gloss value: | | | | | |
| Machine-coated paper | 73 | 100 | 100 | 82 | 68 |

From the Table it can be seen that the printing inks produced with the resins of the invention not only dry equally quickly or considerably more quickly than the comparative product, but also have a better gloss. They adhere excellently to polyethylene and polypropylene foils.

EXAMPLE 26

150 g of colophony and 600 g of maleic-anhydride-styrene telomer (molar ratio 1: 8, molecular weight 1,800) and 100 g of cumarone indene resin (melting point 80°C, acid number 0.1, viscosity 13 cP) are heated with 45 g of maleic anhydride for 1 hour at 200°C, and then 10 g of pentaerythritol, 20 g of glycerin and 20 g of a 70 percent isobutanol solution of a propoxylated phenol-isobutyraldehyde-novolac (OH-number 260, calculated as solid resin) are added. To remove the isobutanol heating takes place at 200°C at 50 mm Hg. Then 100 g of styrene are added and the mixture is heated to 260°C, accompanied by water removal on the reflux condenser, and with the addition of a total of 30 ml of xylene this temperature is maintained for 3 hours. Then the volatile ingredients are removed under reduced pressure. 1,133 g of resin (colophony content 13.2 percent by weight) are obtained with the following characteristics: melting point 101°C, acid number 40, viscosity 239 cP.

EXAMPLE 27

2,250 g of colophony and 525 g of styrene are heated at 270°C for 3½ hours with the return of the styrene and with the removal of 2 ml of water. From the obtained reaction product 617 g are heated with 52.5 g of maleic anhydride for 30 minutes at 200°C, and then 30 g of an alkaline condensed p-tert.-butylphenol-formaldehyde resin are added (molar ratio 1:1.6 melting point 60°C. After a further 30 minutes 50 g of zinc oxide are added within 15 minutes and the mixture is heated to 260°C. Then 30 g of glycerin are added dropwise and the mixture is kept at this temperature for 2 hours with a return of xylene and the addition of a total of 30 ml of xylene. The volatile ingredients are then removed. A total of 24 ml of water are separated. 715 g of resin (colophony content 70 percent) are obtained with a melting point of 126°C, acid number 90, viscosity 46.4 cP.

EXAMPLE 28

To 1,500 g of molten colophony are added at 160°C, 80 g of maleic anhydride and then 15 g of sorbitol, 75 g of glycerin and as further esterification components 250 g of a propoxylated isobutyraldehyde-phenol-novolac (hydroxy number 270). Then 350 g of styrene, 20 g of zinc oxide, 500 g of a water-soluble phenol-formaldehyde resin (resol, viscosity 280 cP, residue 68.5 percent, molar ratio formaldehyde : phenol 1.5 : 1), 100 g of phenol and 35 g of paraformaldehyde are added. Condensation takes place for 1 hour at 100°C, then with continuous water removal heating takes place for 2 hours at 260°C. Then over the period of 1 hour the volatile ingredients are removed under reduced pressure at 250°C. 2,510 g of a resin (colophony content 59.7 percent) with the following characteristics are obtained: melting point 124°C, acid number 46, viscosity (50 percent in toluene) 370 cP.

The product is suitable both as a binder for printing inks, particularly for toluene gravure, as well as for adhesives.

EXAMPLE 29

1,200 g of colophony are reacted with 600 g of a commercial hydrocarbon resin (melting point 142°C, acid number 28, viscosity 120 cP), modified with 5 percent of maleic anhydride, 20 g of maleic anhydride, 15 g of pentaerythritol, 350 g of styrene, 400 g of phenol-formaldehyde resin (resol according to Example 22), 380 g of phenol and 150 g of paraformaldehyde in the presence of 20 g of zinc oxide. With water separation, the mixture is brought to 260°C and by adding xylene with continuous return of the xylene kept for 3 hours at 260°C. The volatile ingredients are removed after 15 minutes at 50 mm Hg. 2,730 g of resin are obtained with a melting point of 124°C, acid number 38, viscosity (50 percent in toluene) 290 cP, colophony content 44 percent by weight. The resin is suitable both as a printing ink binder and for adhesives.

EXAMPLE 30

1,500 g of colophony and 300 g of a partially intramolecularly esterified colophony-phenol-adduct (molar ratio 1 : 1, melting point 125°C, acid number 57, viscosity 23 cP) are heated with 375 g of maleic anhydride for 30 minutes at 200°C. Then 350 g of glycerin and 300 g of styrene are successively added and the mixture is heated for 3 hours at 240°C with return of the styrene and water separation. Then at this temperature a further 300 g of styrene are added dropwise over a period of 2½ hours and the mixture is heated at 260°C and with the addition of xylene kept at this temperature for a further hour. The volatile ingredients are finally removed and 2,873 g of resin (colophony content approximately 60 percent) are obtained of melting point 135°C, acid number 50, viscosity 135 cP.

toluene gravure printing on paper and polyethylene or polypropylene foils.

Comparative Test

If a resin is produced according to Example 32 but without any styrene, then the resin cross-links at 220°C and becomes unusable.

Printing Test

The printing test of the resins according to Examples 26 to 32 was performed in accordance with Example 25. The results are given in the following Table 2.

Table 2

| | Examples | | | | | | | Comparative product |
|---|---|---|---|---|---|---|---|---|
| | 26 | 27 | 28 | 29 | 30 | 31 | 32 | |
| Dye residue as a percentage | 35.6 | 46.4 | 40 | 41 | 46.2 | 42.1 | 38.2 | 40.1 |
| Solvent given off in seconds: Machine-coated paper. | 58 | 55 | 52 | 46 | 50 | 42 | 45 | 62 |
| Terephthalate foil | 65 | 58 | 56 | 50 | 55 | 53 | 49 | 78 |
| Lange gloss value: Machine-coated paper. | 73 | 95 | 85 | 87 | 84 | 86 | 79 | 68 |

EXAMPLE 31

1,500 g of colophony and 120 g of maleic anhydride are heated for 1 hour at 200°C. Then 40 g of zinc oxide are added. After 15 minutes 25 g of glycerin and 230 g of pentaerythritol are added. At 160°C 350 g of a phenol-formaldehyde resin (prepared by adding 1,270 g of styrene to 1,776 g of phenol) under the action of p-toluene-sulphonic acid, and then alkaline condensation with 592 g of formaldehyde; characteristics: viscosity 3,020 cP, free formaldehyde 0.45 percent, stoving residue 2 g of resin for 1 hour at 135°C, 78 percent) modified with styrene. The mixture is heated for 2 hours at 250°C and kept for 3 hours at this temperature under normal pressure and then for 1 hour at 50 mm Hg and then emptied. Yield: 2,072 g of resin (colophony content 72.3 percent) are obtained, melting point 136°C, acid number 39, viscosity 500 cP, solubility in toluene random. 10 g of a 50 percent toluene solution of the resin are mixable without separation with 10 g of a 20% chlorinated rubber solution. The resin is excellently suitable as an gravure dye binder.

EXAMPLE 32

To 450 g of tall oil resin acid are added 470 g of phenol 150°C and the mixture is mixed with 75 g of 30 percent formalin solution, 150 g of paraformaldehyde and 10 g of zinc oxide. The mixture is condensed under reflux for 2 hours and then are added 60 g of maleic anhydride, followed by condensation under reflux for 1 hour. After the addition of 700 g of tall oil resin acid and 100 g of styrene the mixture is heated accompanied by water removal to 170°C. 158 g of glycerin are added and then within 1½ hours at 250°C are added dropwise 100 g of styrene at reflux. The temperature thereby drops to 235°C and within 1 hour reaches 260°C. With the addition of xylene and accompanied by water removal the mixture is kept for 4 hours at 260°C. Then the readily volatile ingredients are removed and 1,916 g of resin (natural resin content approximately 60 percent) are obtained. Characteristics: melting point 123°C, acid number 37, viscosity 610 cP, solubility in toluene random. The resin is suitable for It can be seen from the Table that the printing inks with the resins produced according to the invention not only have a more rapid giving off of the solvent, but also much higher gloss values than the inks from the comparative resin.

EXAMPLE 33

1,500 g of colophony are melted together with 20 g of maleic anhydride. At 200°C 750 g of p-tert.-butylphenol and 230 g of glycerin are added. The temperature drops to 120°C and 330 g of paraformaldehyde and 10g of 33 percent caustic soda solution are added, followed by condensation for 3 hours at 120° to 125°C at reflux. Then 300 g of styrene and a further 130 g of maleic anhydride are added, followed by heating for 2 hours at 260°C with water removal. By adding 60 ml of xylene the temperature is kept constant at 260°C. Then the unreacted butylphenol and xylene are removed under reduced pressure and 2,637 g of resin (colophony content 56.8 percent) are obtained of melting point 127°C, acid number 26, viscosity 126 cP.

Production of a lacquer:

50 parts of linseed oil and 25 parts of the resin obtained are heated to 250 C. After cooling 0.05 percent by weight of cobalt, 0.36 percent by weight of lead and 0.01 percent by weight of manganese naphthenate are added. Then the mixture is adjusted by adding white spirit to 80 seconds outflow time in a DIN/4 mm beaker.

Comparative Test

A resin (melting point 132°C, acid number 20, viscosity 120 cP) produced from colophony, diphenylolpropane, formaldehyde and glycerin are in the same way processed to a lacquer.

Both samples are applied to glass plates with a wet coating thickness of 100 μ, and dried for 24 hours at room temperature. The lacquer produced from the resin according to Example 33 has a smooth surface, whereas the comparative product exhibits wrinkling. It is not intended that the examples given herein should be construed to limit the invention thereto, but rather

What we claim is:

1. A process for the manufacture of an ink binder being a modified natural resin product comprising reacting (a) colophony, wood rosin, tall oil, rosin acids or abietic acid with (b) at least one ethylenically unsaturated monomer having from 2 to 12 carbon atoms and being free from carboxylic groups and anhydride groups, and (c) either a phenol resin which is a condensation product of a phenol with an aldehyde having 1 to 7 carbon atoms or the components of said condensation product at a temperature in the range of 120°to 280°C.

2. A process as claimed in claim 1 wherein component (a) prior to its reaction with (b) and (c) or the reaction product obtained from the reaction of (a), (b), and (c) is reacted with a minor amount of a carboxylic acid having 3 to 9 carbon atoms, its anhydride or its esterification product with a polyhydric alcohol having 2 to 26 carbon atoms in which at least one carboxylic group is esterified.

3. A process as claimed in claim 1 wherein the reaction product obtained from the reaction of (a), (b) and (c) is esterified in an amount of at least 10 percent by weight of the free COOH-groups in the product with at least one substance selected from (d) a polyhydric alcohol having 2 to 26 carbon atoms, and (e) a mixture of (d) and a carboxylic acid having 3 to 9 carbon atoms.

4. A process as claimed in claim 1 wherein, said component (a) and the unsaturated monomer are reacted in the presence of a catalyst selected from the group consisting of (f) an organic peroxide, (g) a cobalt metal salt accelerator and (h) a mixture of (f) and (g).

5. A process as claimed in claim 1 wherein one of the components (a) or (c) or the components of (c) are first reacted with the monomer and subsequently the other one of the components (a) or (c) is reacted.

6. A process as claimed in claim 1 wherein the free carboxylic groups or those derived from the anhydride groups of the partially esterified or unesterified reaction product are reacted with a metal compound to form metal salt groups.

7. A process as claimed in claim 6 wherein the metal compound is a compound of zinc, magnesium of calcium or a mixture thereof and wherein the metal content of the total reaction product containing metal salt groups is from 1 to 7 percent by weight.

8. A process as claimed in claim 7 wherein the amount of the magnesium in the form of its salt to the amount of the calcium or of the mixture of calcium and zinc in the form of their salts is within the range of from 2 : 1 to 1 : 2.

9. A modified natural resin product obtained by the process of claim 1.

10. A binding agent containing a product as claimed in claim 9.

11. An adhesive which contains the binding agent of claim 10.

12. A printing ink which contains the binding agent of claim 10.

13. A process for the manufacture of a modified natural resin product wherein (a) colophony, wood rosin, tall oil or rosin acids are reacted with (b) at least one ethylenically unsaturated monomer having from 2 to 12 carbon atoms and being free from carboxylic groups and anhydride groups, and (c) either a phenol resin which is a condensation product of a phenol with an aldehyde having 1 to 7 carbon atoms or the components of said condensation product, wherein the monomer (b) is first reacted with phenol as component (c) in a molar proportion of components (b) : (c) of (0.01 to 1) : 1 and subsequently the reaction product is further reacted with and formaldehyde and component (a).

14. A process for the manufacture of a modified natural resin product wherein (a) colophony, wood rosin, tall oil or rosin acids are reacted with (b) at least one ethylenically unsaturated monomer having from 2 to 12 carbon atoms and being free from carboxylic groups and anhydride groups, and (c) either a phenol resin which is a condensation product of a phenol with an aldehyde having 1 to 7 carbon atoms or the components of said condensation product, wherein the amount of the component (a) in the reaction product is from 15 to 85 percent by weight, that of the monomer (b) is from 0.2 to 20 percent by weight of the reaction product and that of the phenol is from 1 to 50 percent by weight, referred to the total reaction product and wherein the phenol resin is based on a trifunctional phenol.

* * * * *